United States Patent
Fye et al.

(10) Patent No.: US 6,905,901 B1
(45) Date of Patent: Jun. 14, 2005

(54) METHOD OF MANUFACTURING A COVER OF A BACKLIT DISPLAY USING FLUORESCING MATERIALS

(75) Inventors: Michael E. Fye, Kokomo, IN (US); Paul A. Uglum, Noblesville, IN (US); Ray Lippmann, Howell, MI (US); Gail M. Sylvester, Frankenmuth, MI (US)

(73) Assignee: Delphi Technologies, Inc., Troy, MI (US)

( * ) Notice: Subject to any disclaimer, the term of this patent is extended or adjusted under 35 U.S.C. 154(b) by 23 days.

(21) Appl. No.: 10/107,766

(22) Filed: Mar. 27, 2002

(51) Int. Cl.⁷ .............................................. H01L 21/00
(52) U.S. Cl. ............................ 438/29; 362/559; 445/24
(58) Field of Search .......................... 438/29; 359/227; 362/558–559; 445/23–24, 58

(56) References Cited

U.S. PATENT DOCUMENTS

| | | | | |
|---|---|---|---|---|
| 4,910,090 A | * | 3/1990 | Kuhlman et al. | 428/469 |
| 5,346,954 A | * | 9/1994 | Wu et al. | 525/85 |
| 5,432,684 A | * | 7/1995 | Fye et al. | 362/30 |
| 5,477,430 A | * | 12/1995 | LaRose | 362/84 |
| 5,613,750 A | * | 3/1997 | Roe | 362/26 |
| 5,718,326 A | * | 2/1998 | Larose et al. | 200/314 |
| 5,736,233 A | * | 4/1998 | Fye | 428/204 |
| 5,916,450 A | * | 6/1999 | Muggli et al. | 216/4 |
| 5,951,349 A | * | 9/1999 | Larose et al. | 445/22 |
| 6,111,696 A | * | 8/2000 | Allen et al. | 359/495 |
| 2003/0038596 A1 | * | 2/2003 | Ho | 313/512 |

* cited by examiner

Primary Examiner—Thuy Vinh Tran
(74) Attorney, Agent, or Firm—Stefan V. Chmielewski

(57) ABSTRACT

A backlit display allowing one or more colors to be properly illuminated. Included in the backlit display is a light source that emits light upon a backside of a substrate. A selectively applied opaque layer prevents light from a light source from passing through at least one selected portion of said substrate. Incorporated into the substrate is one or more fluorescing materials to diffuse the light and/or change the color of the light emitted from the light source.

8 Claims, 2 Drawing Sheets

METHOD OF MANUFACTURING A COVER OF A BACKLIT DISPLAY USING FLUORESCING MATERIALS

BACKGROUND OF THE INVENTION

1. Technical Field

The present invention relates to the field of illuminated displays. More specifically, the invention relates to generating color graphics within an illuminated display.

2. Background of the Invention

Various types of lights can be used as the light source in illuminated displays, such as a backlit display, with the choice often dictated by the industry and the application in which the back light is going to be utilized. For instance, in the automotive industry, light emitting diodes (LEDs) are commonly-used in backlit displays due to their size, durability, longevity and energy consumption properties. However, due to their nature, it is difficult to manufacture LEDs that emit light over a large spectrum of frequencies, which in turn makes their use in backlit displays difficult. For instance, commonly used blue LEDs do not emit energy of the appropriate wavelengths required to properly illuminate the colors yellow, orange or red in a backlit display. Greater frequency spectrum LEDs do exist, but commonly-available white LEDs tend to be expensive and tend to have varying colors and wavelengths in their emitted light.

Prior art structures used to control backlighting of graphics often rely on coating a light cover with multiple layers of light-modifying materials to generate the desired visual effect of the graphics. For example, as shown in FIG. 1, a light source 10 may be covered by a cover 15 made of a substrate 20 and a diffusing layer 22 to diffuse the emitted light. A fluorescing layer 24 and a graphics color layer 26 are deposited on top of the diffusing layer 22 to absorb light energy that does not correspond to the desired color. An opaque topcoat 28 with an opening 30 in the shape of the desired graphic allows the light escaping the cover 15 to reach the viewer. This complicated layered structure, however, requires many manufacturing steps, introducing a high degree of variability between components.

There is a desire for a simplified apparatus and method that can control colors in an illuminated display.

SUMMARY OF THE INVENTION

Accordingly, one embodiment of the invention is directed to a cover for a backlit display, comprising a light-passing substrate having at least one fluorescing material incorporated into said substrate, and an opaque layer selectively applied to said front side of said substrate to form a graphic, wherein the opaque layer prevents light from passing through at least one selected portion of said substrate.

Another embodiment of the invention is directed to a backlit display that displays a graphic, comprising a light source that emits light having a first spectrum and a cover comprising a light-passing substrate containing a fluorescing material that absorbs at least a portion of the first spectrum and emits a light of a second spectrum, and an opaque layer selectively applied to said front side of said substrate to form the graphic, wherein the opaque layer prevents light from a light source from passing through at least one selected portion of said substrate.

A further embodiment of the invention is directed to a method of manufacturing a cover for a backlit display, comprising the steps of combining a polymer material with a fluorescing material to form a substrate material, forming a substrate from the substrate material, and selectively disposing an opaque layer on the substrate material to form a graphic, wherein the opaque layer prevents light from a light source from passing through at least one selected portion of said substrate.

BRIEF DESCRIPTION OF THE DRAWINGS

The present invention will now be described, by way of example, with reference to the accompanying drawings, in which.

DESCRIPTION OF THE EMBODIMENTS

Figure 1:
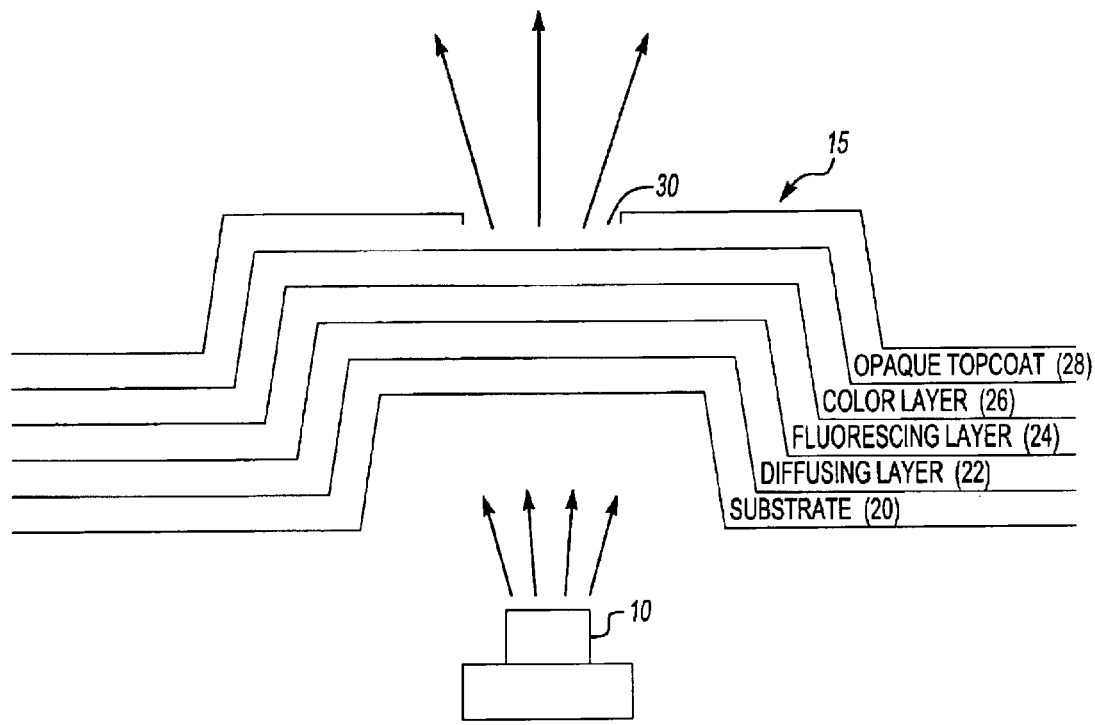
FIG. 1 is a representative diagram of a known apparatus for illuminating displays.
Figure 2:
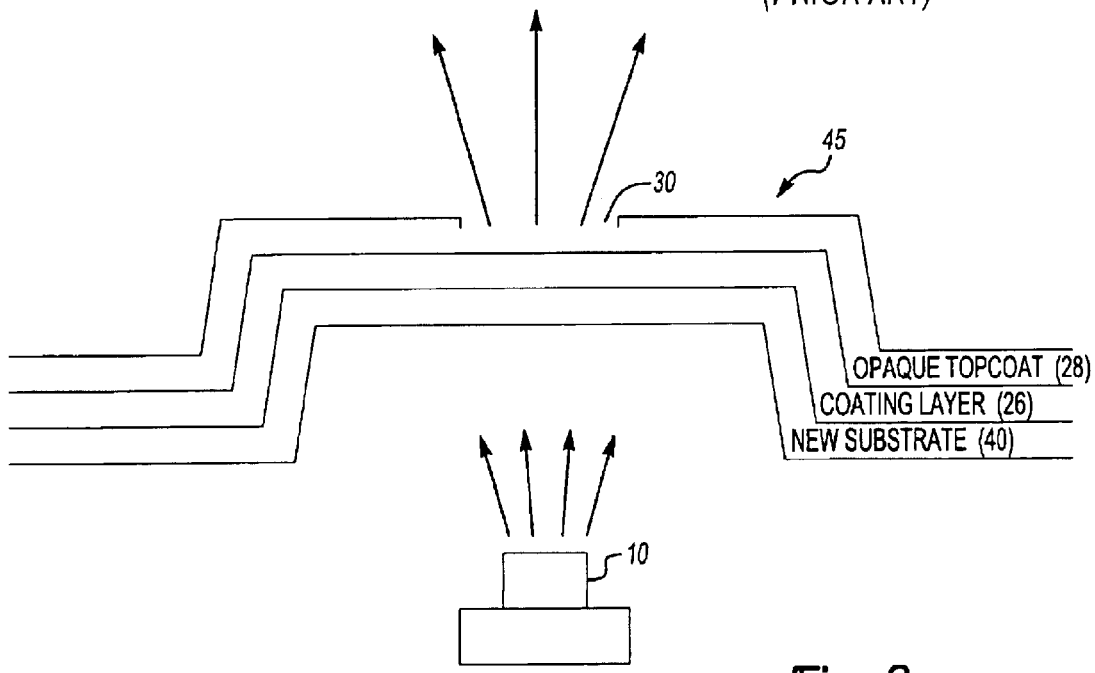
FIG. 2 is a representative diagram of one embodiment of the inventive apparatus.

FIG. 2 illustrates one embodiment of an inventive system for illuminating displays, such as a backlit display. In this example, a back light source 10 emits light toward substrate 40, which forms the base of a cover 45. In one embodiment, the substrate 40 is made of a transparent or translucent plastic resin, such as a natural polycarbonate or acrylic, that can be formed into a variety of shapes and sizes. Regardless of the specific material used in the substrate 40, the substrate 40 itself should allow at least some light to pass through it. The substrate 40 may be formulated to incorporate into its compositional makeup both a diffusing substance and one or more fluorescing materials, such as dyes or pigments.

According to one embodiment, the diffusing substance is silica-based. In an alternative embodiment, it is acrylic-based. Regardless of these embodiments, the diffusing substance is not limited to these examples, but can be any appropriate composition that can introduce light scattering particles into the makeup of the substrate 40.

One or more fluorescing materials may also incorporated into the substrate 40. Standard powdered dyes, such as BASF Lumigen(R) series, are one appropriate dye type that allows for easy integration into the substrate, although other forms and types of dyes could be used. The appropriate dye or dyes are selected based on the type of light source used and the desired color or colors one wishes to depict in a graphic. For instance, after determining the color of the graphic one wishes to depict, one or more dyes are selected such that the spectra of light emitted by the dye falls on both sides of the specific frequency of light associated with the color of the graphic. For a practical example, consider a backlit display in an automobile that uses blue LEDs as its back light source. If a green-colored arrow is to be displayed on a button in an instrument panel, for example, the substrate 40 of the cover 45 could be formed into the shape of the button and contain yellow-colored fluorescing dye. Transmitting light from a blue back light source 10 through the yellow substrate 40 would generate a green illuminated graphic. In another example, the substrate 40 may include an orange-colored fluorescing dye to generate a pink illuminated graphic.

According to one embodiment, the substrate 40 is manufactured by standard coloring and extrusion techniques within the polymer industry. In one example provided for illustrative purposes, pellets of natural polycarbonate or acrylic arc introduced into a tumbler, along with a silica-based powder comprising the diffusing substance and one or more powdered dyes. The subsequent mixture is then fed into a hopper and fed into the heated screw of an extruder to liquefy and combine the mixture uniformly. The mixture is then cooled and chopped into uniformly-colored pellets. The final substrate can then be reformed through standard injection molding techniques.

An optional coating layer 26 may be disposed on the substrate 40. The coating layer 26 may be colored to provide a desired daytime graphics appearance and to hide the substrate 40 underneath it. An opaque topcoat 28 is then applied onto the coating layer 26 to block light from passing through areas other than through the opening 30. One or more openings 30 are selectively cut into the topcoat 28 to reveal portions of the coating layer 26 underneath. The opening 30 can have any shape of any desired graphic, such as an arrow, words, numbers, etc. so the user ultimately sees an illuminated graphic having the color of the exposed coating layer 26. Note that if the coating layer 26 is omitted from the cover 15, the opaque layer 28 may be deposited directly onto the substrate 40.

In one embodiment, the openings 30 in the opaque topcoat 28 are formed via a lasing process. In one embodiment, a laser heats the opaque material to the point of evaporation, thereby allowing precise cuts to be made in the opaque topcoat 28. In an alternative embodiment, an etching process could be used. The invention is not limited to these methods, but could use any appropriate means for selectively removing portions of the opaque topcoat 28 to form one or more openings 30 in the shape of the desired graphic.

Figure 3:
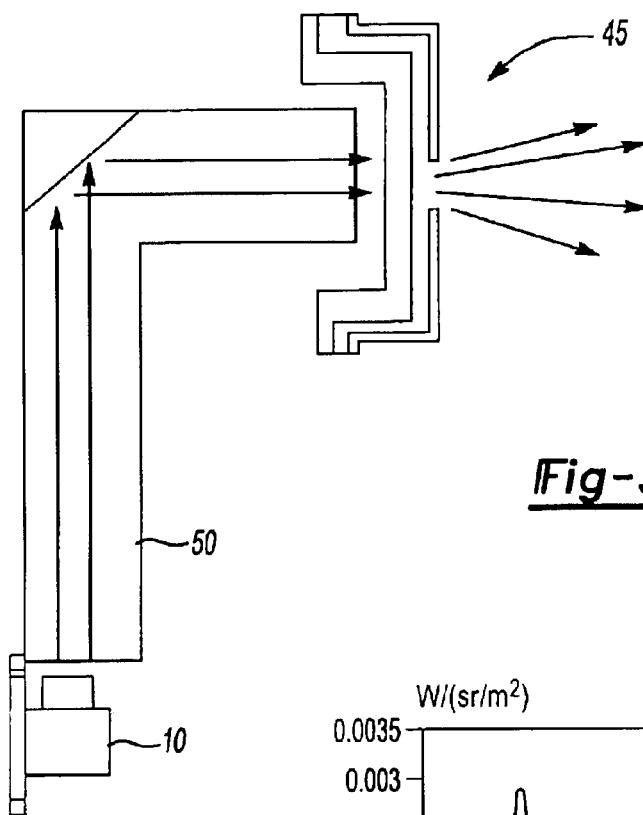
FIG. 3 is a representative diagram of another embodiment of the inventive apparatus.

FIG. 3 illustrates another embodiment of the invention. In this embodiment, the light source 10 is not directly behind the cover 45. Instead, the light emitted from the light source 10 is directed through any known light-carrying conduit, such as a light pipe 50 before being output to the cover 45. Using a light pipe 50 eliminates the need to place the light source 10 directly behind the cover 45, providing designers with more flexibility in the relative positions between the light source 10 and the cover 45.

By incorporating a colored fluorescing material into the substrate itself rather than applying colored materials and fluorescing materials as separate layers onto the substrate, the invention reduces the number of manufacturing steps needed to generate the cover 45 and a graphic having a desired color. Further, the back light source 10 according to one embodiment invention does not need to emit all the frequencies necessary to illuminate all the desired colors in the graphic to be depicted. Instead, the fluorescing dye(s) is selected so as to absorb at least a portion of the energy from the back light, and then re-emit light in a different frequency spectrum that would be appropriate for illuminating the colors present in the graphic to be displayed.

Figure 4A:
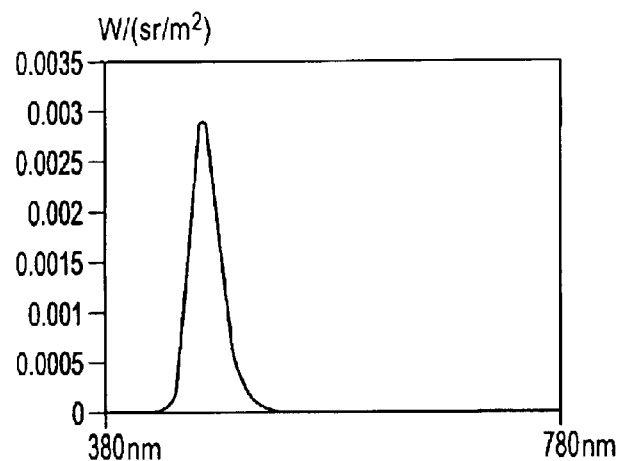
FIGS. 4A and 4B are spectral diagrams illustrating the effect of one embodiment of the invention on transmitted light.
Figure 4B:
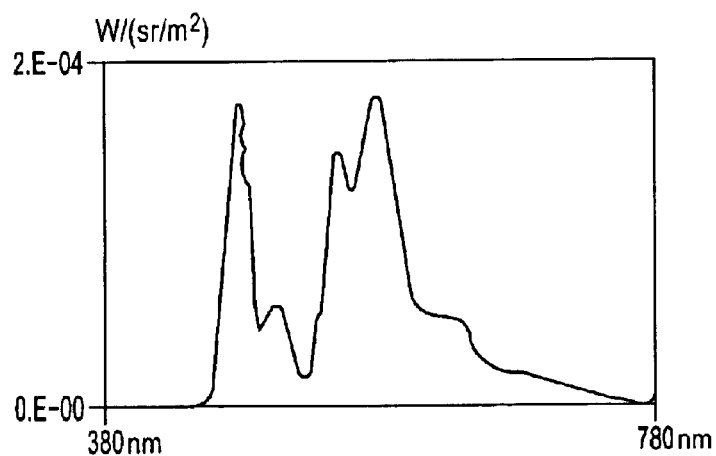

In example, as illustrated in FIG. 4A, the back light source 10 emits light of a first frequency spectrum. FIG. 4A represents the spectral energy of the light from the light source 10, which comprises wavelengths over a limited spectrum. When the light emitted from the light source 10 is transmitted through a substrate 40 incorporating one or more fluorescing dyes, at least a portion of the energy of the back light is absorbed by the dyes and re-emitted in a different frequency spectrum. The resultant light departing the substrate 40 combines the spectral characteristics of the light from the back light source 10 and of the light generated by the one or more fluorescing dyes incorporated into the substrate 40. FIG. 4B shows that the resultant light has frequencies with a wider range of wavelengths after passing through the substrate 40. As a result, varying the diffusing and/or fluorescing materials incorporated into the substrate 40 allows customization of the color and intensity of the final light illuminating the graphic 30.

Utilizing the inventive backlighting system, non-white light sources can be used to easily illuminate graphics regardless of their color. In one embodiment the light source chosen may generate a light spectrum with an energy level higher than that inherent to the desired resulting color. Specifically, the light generated by the back light source may be of a higher frequency (shorter wavelength) than the light subsequently emitted from the fluorescing dye for illuminating a specific color of a graphic. For instance, a blue light can be used in the Applicants' backlighting system to emit and illuminate any color from a longer wavelength blue to a very long wavelength red at the lower end of the visible spectrum. Colors can also be combined to achieve a near-white backlight.

In one embodiment, the backlit display would utilize a blue light source such as readily available blue LEDs commonly used in many industries. However, the claimed invention is not limited to LEDs, but could be used with a variety of different types of lights. Additionally, although it is preferred to utilize a light source that emits energy within the higher frequency blue spectrum, other light sources that generate either higher or lower frequency energy could be used depending on the application.

Several advantages are achieved with the backlighting system disclosed above compared to prior systems. By allowing the use of colored lights or lights of a limited frequency spectrum, one is no longer required to utilize more expensive and complicated "white" light sources. This is particularly true in terms of LED light sources. "White" LEDs, which are essentially blue LED dies packaged with orange phosphor, are extremely expensive. Additionally, due to the complexity of their manufacturing process, they demonstrate significant variability in not only the intensity of light they emit, but also the color or frequency, thereby necessitating the expenditure of time and money to test and sort each light. Similarly, booted LEDs, which include a tightly-fitting, colored cap or boot over the LED, possess the same disadvantages of significant expense and variability in their color output.

The present invention also offers advantages over previous fluorescing dye-based backlit displays, which utilize an ordinary substrate that has no inherent fluorescing or diffusing properties. Instead, a diffusing substance and fluorescing dyes are applied externally to the substrate as separate layers, much like the opaque topcoat, thereby requiring additional steps in the manufacturing process. The claimed invention, by incorporating the diffusing substance and fluorescing dye into the substrate, is able to eliminate several production steps thereby reducing production time and costs.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A method of manufacturing a cover for a backlit display, comprising:

combining a polymer material with a fluorescing material and a diffusing substance to form a substrate material;

forming a substrate from the substrate material; and applying an opaque layer on the substrate to form a graphic, wherein the opaque layer prevents light from a light source from passing through at least one selected portion of said substrate.

2. The method of claim 1, wherein the forming step forms the substrate via injection molding.

3. The method of claim 1, wherein the applying step comprises:

disposing the opaque layer over the substrate; and selectively removing at least a portion of the opaque layer to form the graphic.

4. The method of claim 3, wherein the selectively removing step is conducted via at least one of a lasing process and an etching process.

5. The method of claim 1, further comprising disposing a light-passing coating layer between the substrate and the opaque layer.

6. The method of claim 5, wherein the light-passing coating layer is colored to reflect a daytime graphic color.

7. The method of claim 1, wherein the diffusing substance is a silica-based material.

8. The method of claim 1, wherein the diffusing substance is an acrylic-based material.

* * * * *